Figures 4, 5:
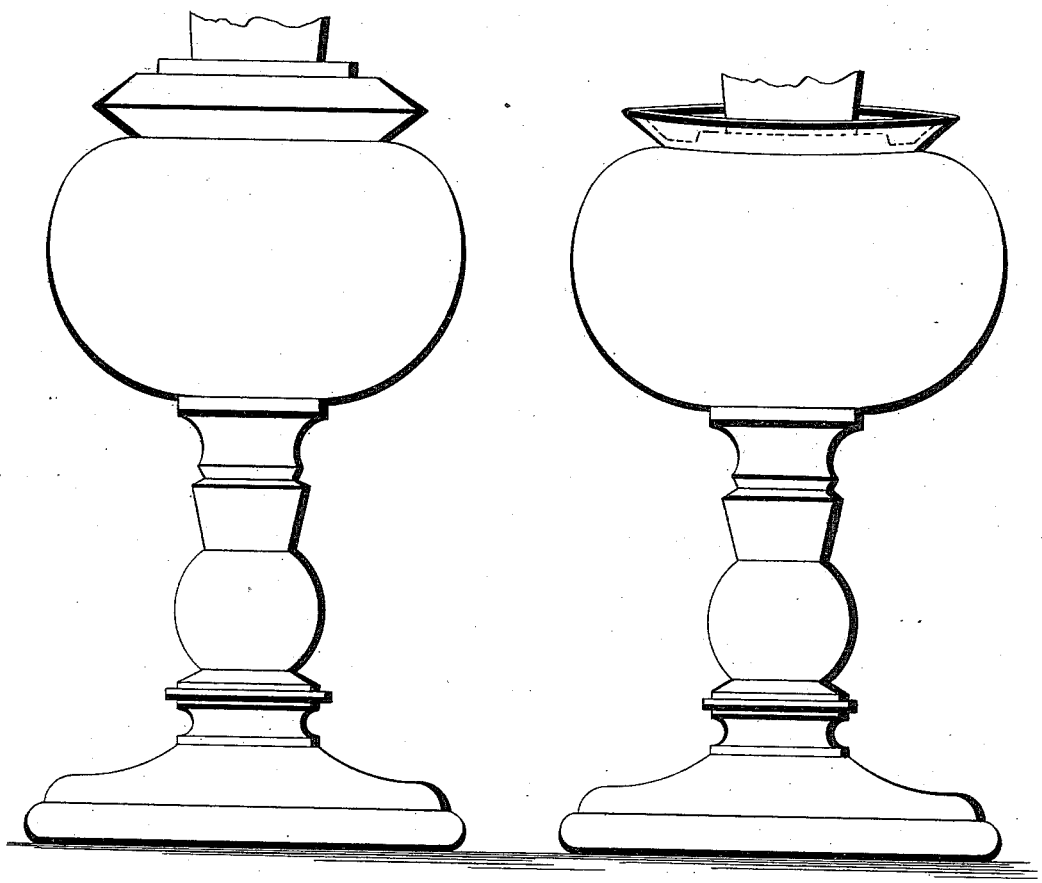

(No Model.) W. L. EWING. 2 Sheets—Sheet 1.
APPARATUS FOR MAKING GLASS LAMPS.
No. 277,414. Patented May 8, 1883.
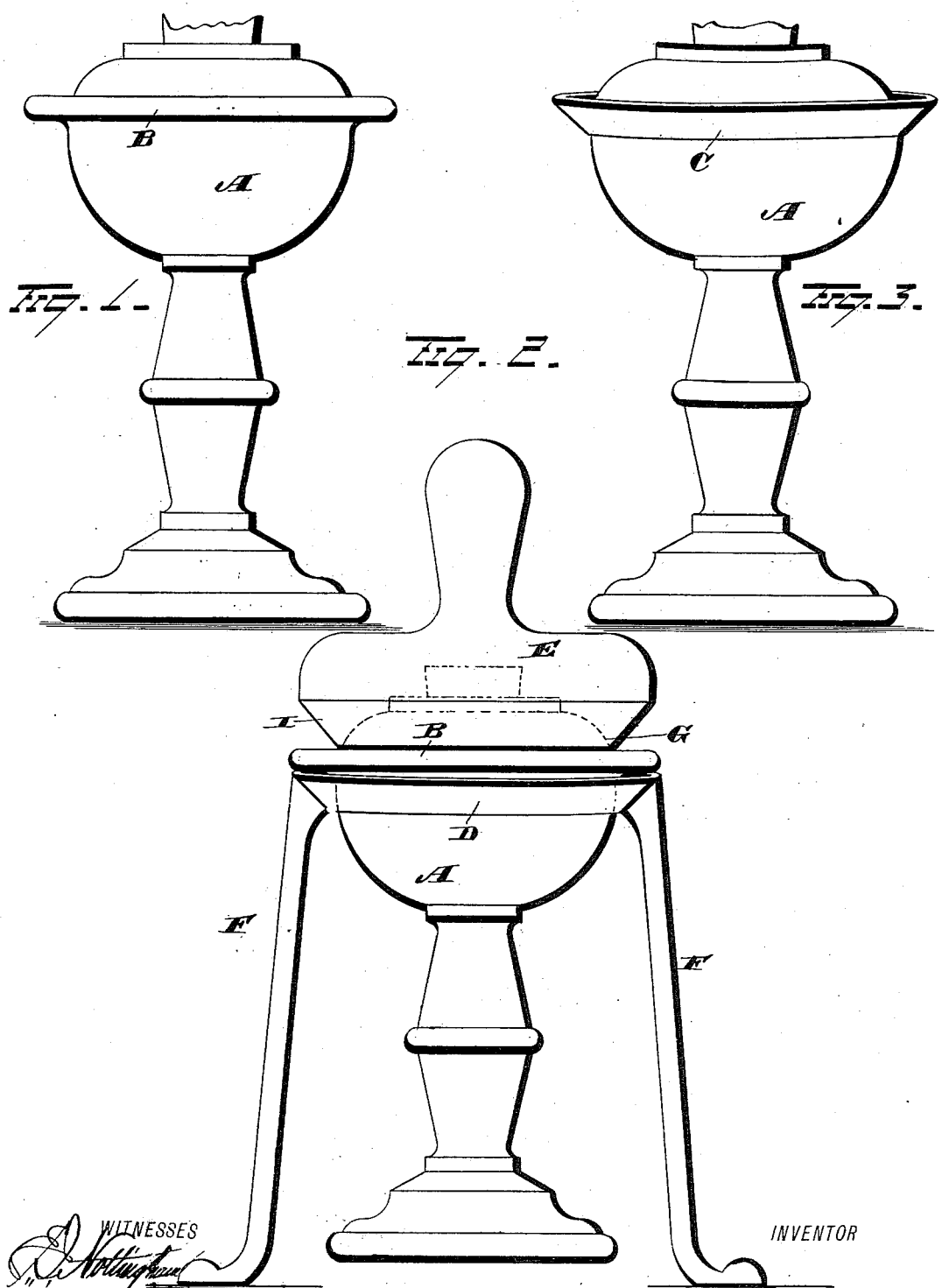

(No Model.) 2 Sheets—Sheet 2.

W. L. EWING.
APPARATUS FOR MAKING GLASS LAMPS.

No. 277,414. Patented May 8, 1883.

WITNESSES  
INVENTOR  
Wm L. Ewing  
Attorney

UNITED STATES PATENT OFFICE.

WILLIAM L. EWING, OF WHEELING, WEST VIRGINIA.

APPARATUS FOR MAKING GLASS LAMPS.

SPECIFICATION forming part of Letters Patent No. 277,414, dated May 8, 1883.

Application filed January 29, 1883. (No model.)

*To all whom it may concern:*

Be it known that I, WILLIAM L. EWING, of Wheeling, in the county of Ohio and State of West Virginia, have invented certain new and useful Improvements in Apparatus for Making Glass Lamps; and I do hereby declare the following to be a full, clear, and exact description of the invention, such as will enable others skilled in the art to which it pertains to make and use the same.

My invention relates to an improved apparatus for manufacturing that class of glass lamps which have their founts encircled by flanges arranged to intercept surface and drip oil, the object of the invention being to reduce the cost of fabricating lamps of this description to the minimum figure.

With this end in view my invention consists in means to contract or unite the walls of a hollow bead blown into and extending around the fount of a lamp, said means consisting of a recessed and beveled die conforming in shape to the top of the fount, and of a ring or its equivalent for supporting the under side of the bead.

My invention further consists in means to contract or unite the walls of a hollow bead blown into and extending around the fount of a lamp, said means consisting of a recessed and beveled die provided with a handle, and of a ring for supporting the under side of the bead, said die and ring being arranged to co-operate in transforming the bead into an oil-intercepting flange.

My invention further consists in means to contract or unite the walls of a hollow bead blown into and extending around the fount of a lamp, said means consisting of a recessed and beveled die conforming in shape to the top of the fount, of a ring for supporting the under side of the bead, and of a standard for the ring.

In the accompanying drawings, Figure 1 is a view in vertical section of a lamp embodying my invention, the same being shown in the first stage of its formation. Fig. 2 is a view in perspective of an incomplete lamp having devices for its completion associated with it. Fig. 3 is a view in perspective of a completed lamp; and Figs. 4 and 5, respectively, represent an incomplete and completed lamp of different style.

In the fabrication of lamps in accordance with my invention they are first blown in open and shut molds of any approved construction, those portions of the molds which form the founts A of the lamps being provided with recesses arranged to receive the glass and form hollow beads B, which encircle the founts. The position of the beads upon the founts depends upon the location of the recesses in the molds, and may be varied, as desired, to suit different styles of lamps by constructing the molds accordingly. When the lamps are removed from the molds they are subjected to such manipulation as is necessary to transform the hollow beads into oil-intercepting flanges C, as shown in Fig. 3 of the drawings.

The manipulation required to transform the beads blown into the founts into flanges is effected by means of mechanically or manually operated devices, as found most desirable. Out of the many devices which may be employed for the purpose only one form has been shown in the drawings, the illustrated devices consisting of a flaring ring, D, and a die, E. The said ring is placed directly below the bead, and conforms to the shape of the fount at that point. As shown in the drawings, it is supported by legs F, but it may be mounted in various other ways. The die E is provided with a recess, G, to receive the upper portion of the fount, and with a beveled edge, I, arranged to co-operate with the ring in forcing the walls of the bead together and in imparting the required form and inclination to the flange. As to the ring, it may be continuous or hinged, as found most convenient to operate.

Inasmuch as the glass of which the lamps are formed is at welding-heat or in a plastic state when the beads are manipulated to transform them into flanges, the walls of the beads will unite when brought together. It is not necessary, however, that the walls of the beads be united in forming the flanges, although it is probable that they will be ordinarily.

The operation of uniting or contracting the walls of the beads will diminish the height and capacity of the founts, and therefore provision for this contraction should be made in blowing them. It may be here remarked that in the hands of a skilled operator a buffer can be very successfully used in forming flanges from the beads; or while the lamps are still in the molds, and before the blow-pipes are detached, the same may be depressed with the effect of wholly or partially closing the beads. This done, the lamps are moved from the molds and subjected to further manipulation, if need be. Again, the lamps may be blown in sectional molds, and when the process of blowing is finished, and after the blow-pipe has been detached, a section of the mold may be removed to expose the upper portion of the fount, the bead of which is now closed or united by a suitable die, the mold in this case taking the place of the ring. It is designed to subject the lamps to the manipulations by means of which their beads are formed into flanges immediately after they are blown; but, if desired, they may be reheated for the purposes of final manipulation. In the drawings, Figs. 4 and 5, respectively, represent an incomplete and a completed lamp of different style from that shown elsewhere. In this lamp the oil-intercepting flange is located near the neck of the fount, being less liable to fracture in handling and packing than when located nearer the center of the fount. This style of lamp is also desirable in lamps when lightness is a leading object of construction.

It is apparent that my invention is not confined to any particular style of lamps, but that it comprehends the provision of all styles of lamps capable of being blown with oil-intercepting flanges. They may, for instance, be applied to chandeliers and bracket and all lamps supported in independent standards formed integral with them, as herein shown.

I am aware that blown lamps have been provided with an annular groove formed in the top of the fount and near its outer edge, made by segmental dies located within the mold and depressed while the lamp is being blown, thereby forming the groove or gutter from the single thickness of the fount and in the upper portion thereof, and hence I would have it understood that I make no claim to the process or article referred to.

Having fully described my invention, what I claim as new, and desire to secure by Letters Patent, is—

1. Means to contract or unite the walls of a hollow bead blown into and extending around the fount of a lamp, said means consisting of a recessed and beveled die conforming in shape to the top of the fount, and a ring or its equivalent for supporting the under side of the bead, substantially as set forth.

2. Means to contract or unite the walls of a hollow bead blown into and extending around the fount of a lamp, said means consisting of a recessed and beveled die provided with a handle, and a ring for supporting the under side of the bead, said die and ring being arranged to co-operate in transforming the bead into a flaring oil-intercepting flange, substantially as set forth.

3. Means to contract or unite the walls of a hollow bead blown into and extending around the fount of a lamp, said means consisting of a recessed and beveled die conforming in shape to the top of the fount, a ring for supporting the under side of the bead, and a standard for the ring, substantially as set forth.

In testimony whereof I have signed this specification in the presence of two subscribing witnesses.

WILLIAM L. EWING.

Witnesses:
J. F. MILLER,
JOHN H. EWING.